United States Patent
Miyashita

(10) Patent No.: US 11,541,604 B2
(45) Date of Patent: Jan. 3, 2023

(54) METHOD FOR PRODUCING THREE-DIMENSIONAL OBJECT USING MOVABLE LENS WITH CONTROL OF LASER POWER, SCAN SPEED AND BEAM DIAMETER

(71) Applicant: Sodick Co., Ltd., Kanagawa (JP)

(72) Inventor: Yasuyuki Miyashita, Yokohama (JP)

(73) Assignee: Sodick Co., Ltd., Yokohama (JP)

(*) Notice: Subject to any disclaimer, the term of this patent is extended or adjusted under 35 U.S.C. 154(b) by 130 days.

(21) Appl. No.: 16/895,251

(22) Filed: Jun. 8, 2020

(65) Prior Publication Data
US 2020/0391445 A1   Dec. 17, 2020

(30) Foreign Application Priority Data

Jun. 11, 2019   (JP) .............................. JP2019-108515

(51) Int. Cl.
| | | |
|---|---|---|
| B29C 64/393 | (2017.01) | |
| B29C 64/153 | (2017.01) | |
| B33Y 30/00 | (2015.01) | |
| B33Y 50/02 | (2015.01) | |
| B33Y 10/00 | (2015.01) | |

(52) U.S. Cl.
CPC .......... *B29C 64/393* (2017.08); *B29C 64/153* (2017.08); *B33Y 10/00* (2014.12); *B33Y 30/00* (2014.12); *B33Y 50/02* (2014.12)

(58) Field of Classification Search
CPC ... B29C 64/393; B29C 64/153; B29C 64/268; B33Y 10/00; B33Y 30/00; B33Y 50/02; Y02P 10/25; B22F 10/28; B22F 10/36; B22F 10/366; B22F 10/38
See application file for complete search history.

(56) References Cited

U.S. PATENT DOCUMENTS

| | | | | |
|---|---|---|---|---|
| 2012/0093674 A1* | 4/2012 | Abe | ........................ | B22F 10/20 264/434 |
| 2014/0265049 A1* | 9/2014 | Burris | .................. | B23K 26/342 264/497 |
| 2014/0271326 A1* | 9/2014 | Cullen | .................... | B29C 64/35 425/78 |

(Continued)

FOREIGN PATENT DOCUMENTS

| | | | |
|---|---|---|---|
| JP | 2016-540895 A | 12/2016 | |
| JP | 2019073794 A | 5/2019 | |

(Continued)

OTHER PUBLICATIONS

Japanese Office Action dated Dec. 3, 2020, in connection with corresponding JP Application No. 2019-108515 (10 pp., including machine-generated English translation).

*Primary Examiner* — Joseph S Del Sole
*Assistant Examiner* — Guy F Mongelli
(74) *Attorney, Agent, or Firm* — Maier & Maier, PLLC

(57) ABSTRACT

A method for producing a three-dimensional molded object includes forming a solidified layer, calculating a laser power, calculating a scanning speed, calculating a beam diameter, and determining that the solidified layer is poor when the laser power is outside a first reference range related to the laser power, the scanning speed is outside a second reference range related to the scanning speed, or the beam diameter is outside a third reference range related to the beam diameter.

3 Claims, 12 Drawing Sheets

(56) References Cited

U.S. PATENT DOCUMENTS

| | | | |
|---|---|---|---|
| 2015/0054204 A1* | 2/2015 | Tseliakhovich | B29C 64/264 |
| | | | 425/162 |
| 2016/0228987 A1 | 8/2016 | Snecma | |
| 2017/0072633 A1* | 3/2017 | Hsu | B33Y 30/00 |
| 2017/0239719 A1* | 8/2017 | Buller | B22F 12/00 |
| 2017/0341180 A1* | 11/2017 | Zediker | B22F 12/41 |

FOREIGN PATENT DOCUMENTS

| | | | | |
|---|---|---|---|---|
| WO | WO-2017137022 A1 * | 8/2017 | | B22F 10/20 |
| WO | 2019028184 A1 | 2/2019 | | |

\* cited by examiner

METHOD FOR PRODUCING THREE-DIMENSIONAL OBJECT USING MOVABLE LENS WITH CONTROL OF LASER POWER, SCAN SPEED AND BEAM DIAMETER

TECHNICAL FIELD

The present application claims priority under 35 U.S.C § 119 to Japanese Patent Application No. 2019-108515, filed Jun. 11, 2019. The contents of this application are incorporated herein by reference in their entirety. The present invention relates to a method for producing a three-dimensional molded object and lamination molding apparatus.

BACKGROUND ART

There are various lamination molding methods. For example, powder bed fusion is a method to produce a desired three-dimensional molded object by repeating formation of a material layer made of a material powder and formation of a solidified layer by irradiation of the material layer with a laser beam. When forming the solidified layer, the laser beam having a desired laser power is adjusted to a desired beam diameter and is scanned on a predetermined irradiation region of the material layer at a desired scanning speed. It should be noted that in the specification, the beam diameter means the diameter of the laser beam on a molding surface, that is, an upper surface of the material layer.

Lamination molding apparatuses have been used not only to manufacture prototypes but also to manufacture end use products, such as dies and molds, medical parts, and aerospace parts. For this reason, lamination molding apparatuses capable of manufacturing high-quality molded objects are being requested.

U.S. Unexamined Patent Application Publication No. 2016/0228987 discloses a method of periodically irradiating a reference support with a laser beam to obtain laser power and confirming whether there is a variation in a laser power.

SUMMARY

When an inappropriate value is set as a laser power, a beam diameter, or a scanning speed, a desired quality molded object may not be obtained. In addition, even if an appropriate value is set, it may not operate according to the set value because of restrictions of the apparatus or failure of the apparatus. Therefore, when stabilizing the quality of the molded object, it is conceivable to confirm the laser power, the beam diameter, and the scanning speed during the formation of the solidified layer.

An object of the present invention is to provide a method for producing a three-dimensional molded object and a lamination molding apparatus that are able to determine whether the state of a solidified layer is good or poor, by confirming the laser power, the beam diameter, and the scanning speed during the formation of the solidified layer.

The present invention provides a method for producing a three-dimensional molded object. The method includes generating a laser beam having a desired laser power, adjusting the laser beam to a desired beam diameter, and forming a solidified layer by scanning the laser beam on a predetermined irradiation region of a material layer at a desired scanning speed, calculating the laser power of the laser beam when forming the solidified layer, calculating the scanning speed of the laser beam when forming the solidified layer, calculating the beam diameter of the laser beam when forming the solidified layer, and determining that the solidified layer is poor when the laser power is outside a first reference range related to the laser power, the scanning speed is outside a second reference range related to the scanning speed, or the beam diameter is outside a third reference range related to the beam diameter.

The present invention also provides a lamination molding apparatus. The apparatus includes an irradiator including a light source configured to generate a laser beam having a desired laser power, a focus control unit configured to adjust the laser beam to a desired beam diameter, and a scanner configured to form a solidified layer by scanning the laser beam on a predetermined irradiation region of a material layer at a desired scanning speed; and a controller including a processor and a memory, wherein: the memory stores a first reference range related to the laser power, a second reference range related to the scanning speed and a third reference range related to the beam diameter, and the processor includes: a laser power calculation circuit configured to calculate the laser power of the laser beam when forming the solidified layer, a scanning speed calculation circuit configured to calculate the scanning speed of the laser beam when forming the solidified layer, a beam diameter calculation circuit configured to calculate the beam diameter of the laser beam when forming the solidified layer, and determination circuit configured to determine that the solidified layer is poor when the laser power is outside the first reference range, the scanning speed is outside the second reference range, or the beam diameter is outside the third reference range.

The method for producing a three-dimensional molded object and lamination molding apparatus according to the present invention are configured to calculate the laser power, the scanning speed, and the beam diameter when forming the solidified layer, and determine whether each is appropriate. The solidified layer is determined to be poor when at least one of the lase power, the scanning speed and the beam diameter is outside a predetermined reference range. This configuration is able to determine the molded state of the solidified layer being molded from the state of the laser beam, and thus to produce a highly accurate three-dimensional molded object.

DETAILED DESCRIPTION

Now, an embodiment of the present invention will be described with reference to the drawings. Various features described in the embodiment below may be combined with each other.

Figure 1:
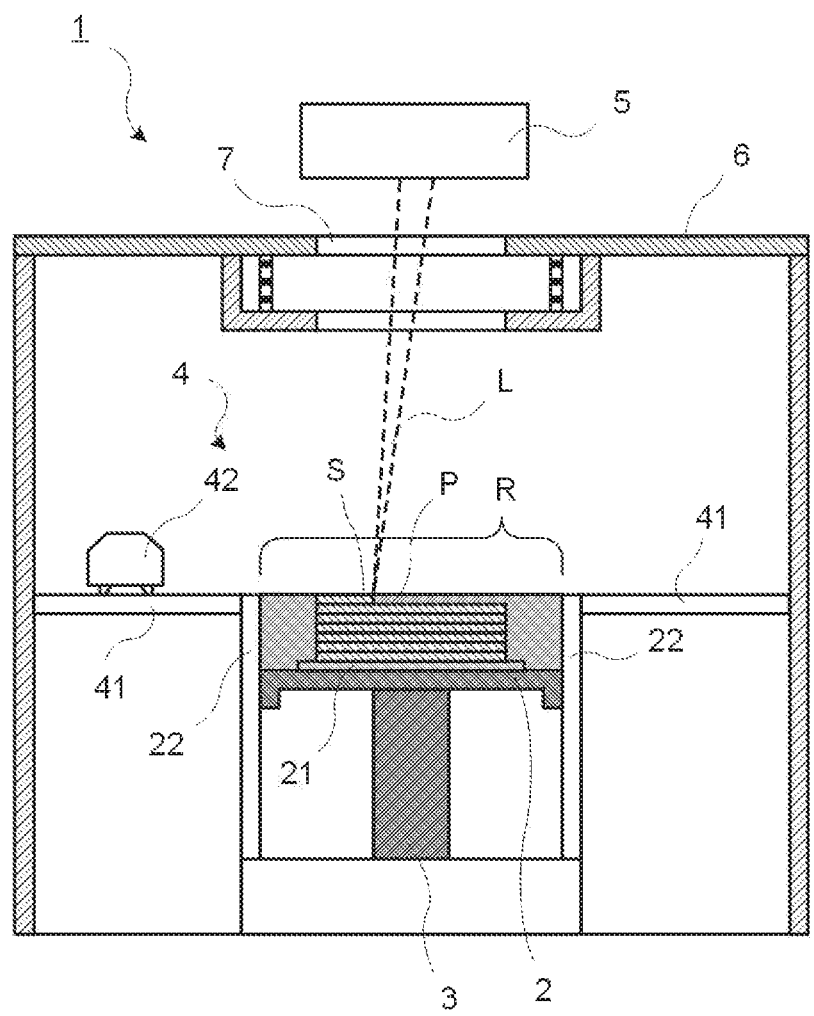
FIG. 1 is a schematic configuration view of a lamination molding apparatus according to an embodiment of the present invention.

As shown in FIG. 1, a lamination molding apparatus 1 includes a chamber 6, a material layer formation device 4, a table 2, and an irradiator 5.

The chamber 6 is formed so as to be substantially sealed and covers a molding region R in which a desired three-dimensional molded object is formed. Desirably, the chamber 6 is filled with an inert gas. The inert gas is a gas that does not substantially react with a material layer P or a solidified layer S and is, for example, nitrogen or argon.

The material layer formation device 4 is disposed in the chamber 6 and forms the material layer P having a predetermined thickness in the molding region R. The material layer formation device 4 includes a base 41 and a recoater head 42. The recoater head 42 is disposed on the base 41 and is reciprocated on the molding region R in one horizontal direction by a recoater head drive device including any type of actuator, such as a motor 843.

Figure 2:
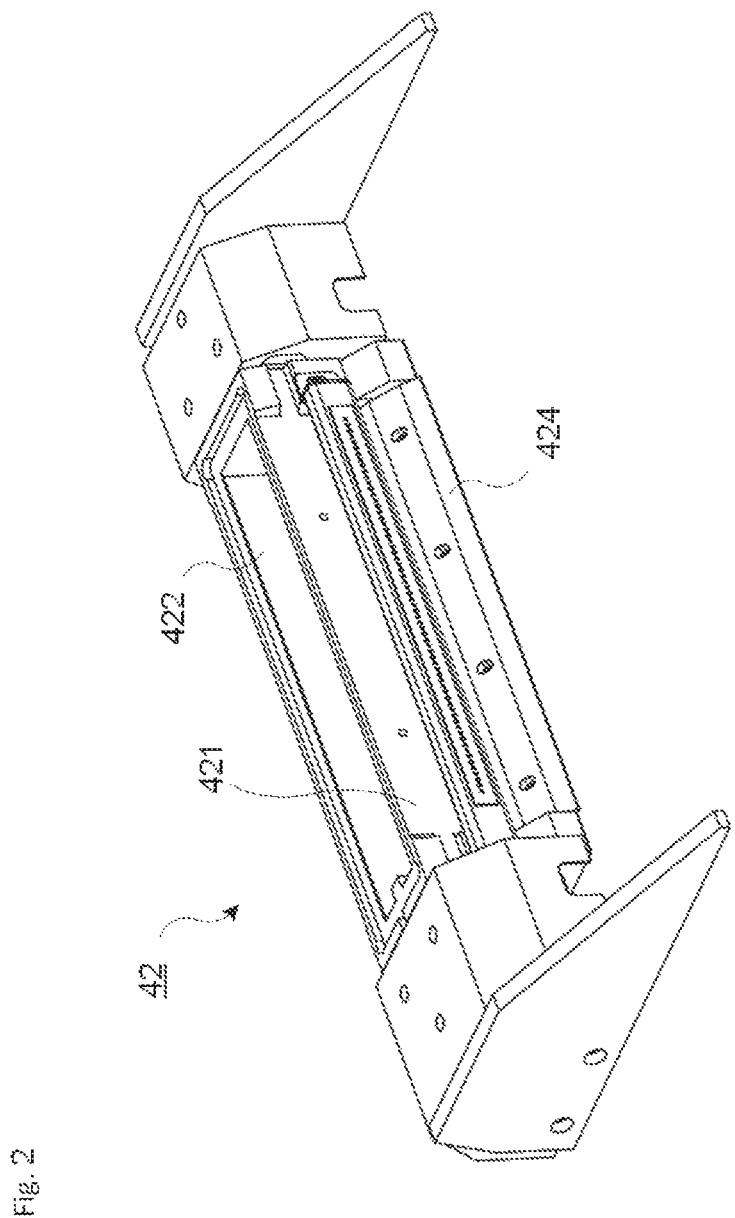
FIG. 2 is a perspective view of a recoater head seen from above.
Figure 3:
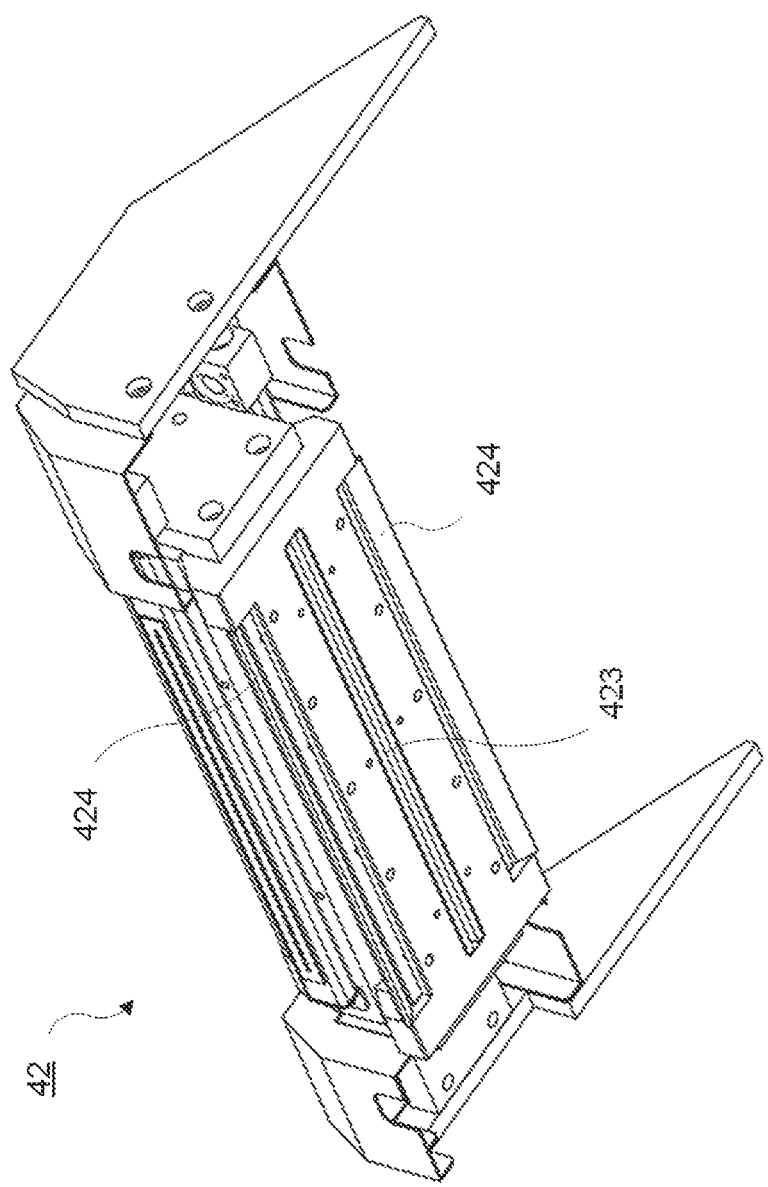
FIG. 3 is a perspective view of the recoater head seen from below.

As shown in FIGS. 2 and 3, the recoater head 42 includes a material container 421, a material supplying section 422, and a material discharging section 423. The material container 421 stores a material powder. The material supplying section 422 is disposed on a top surface of the material container 421 and serves as a receiver of the material powder supplied from a material supplier (not shown) to the material container 421. The material discharging section 423 is disposed on a bottom surface of the material container 421 and discharges the material powder stored in the material container 421. The material discharging section 423 is in a shape of a slit and extends in one horizontal direction perpendicular to the movement direction of the recoater head 42. A blade 424 is disposed on one side surface or both sides surfaces of the recoater head 42. With movement of the recoater head 42, the blade 424 flattens the material powder discharged from the recoater head 42 so that the material layer P is formed on the molding region R.

The table 2 is disposed in the molding region R. The table 2 is vertically moved by a table drive device 3 including any type of actuator. In the present embodiment, the table drive device 3 includes a slide base disposed under the table 2, a feed screw, and a guide base that supports the feed screw. The feed screw of the table drive device 3 includes a screw shaft, a nut fastened to the screw shaft and fixed to a side surface of the slide base, and a motor 853 that rotates the screw shaft. Powder holding walls 22 are disposed around the table 2. An unsolidified material powder is held in a space surrounded by the table 2 and the powder holding walls 22. When forming a three-dimensional molded object, a base plate 21 may be placed on the table 2. In this case, the first material layer P is formed on the base plate 21.

Figure 4:
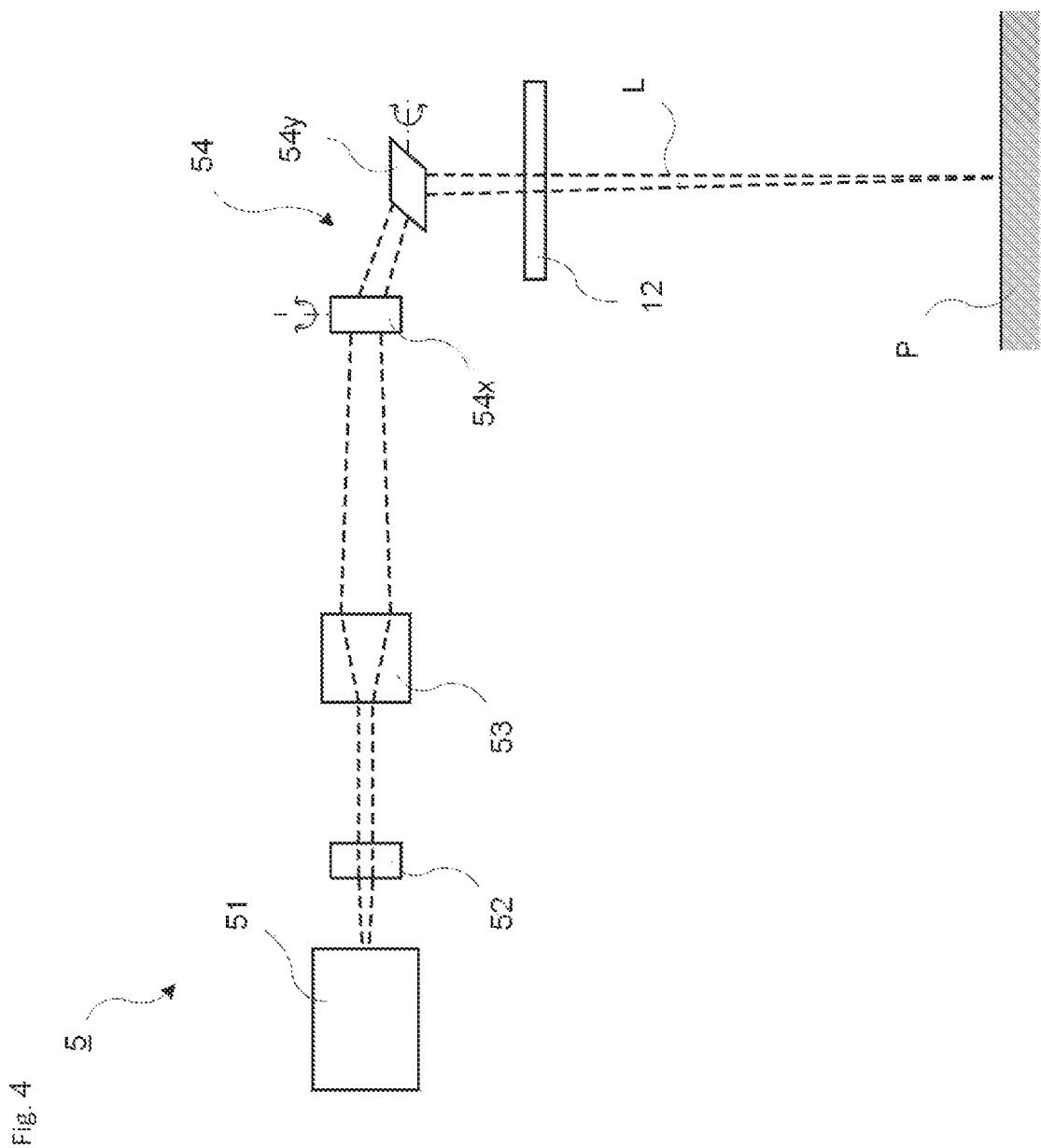
FIG. 4 is a schematic configuration view of an irradiator in the embodiment.

The irradiator 5 is disposed above the chamber 6. The irradiator 5 irradiates a predetermined irradiation region of the material layer P formed in the molding region R with a laser beam L so that the material layer P is melted or sintered in the irradiation position, thereby forming the solidified layer S. Formation of the material layer P and formation of the solidified layer S are performed for each of divided layers which is obtained by dividing the desired three-dimensional molded object with the predetermined thickness. The irradiation region exists in the molding region R and approximately matches a region surrounded by an outline of the three-dimensional molded object for each divided layer. As shown in FIG. 4, the irradiator 5 includes a light source 51, a collimator 52, a focus control unit 53, and a scanner 54.

Figure 5:
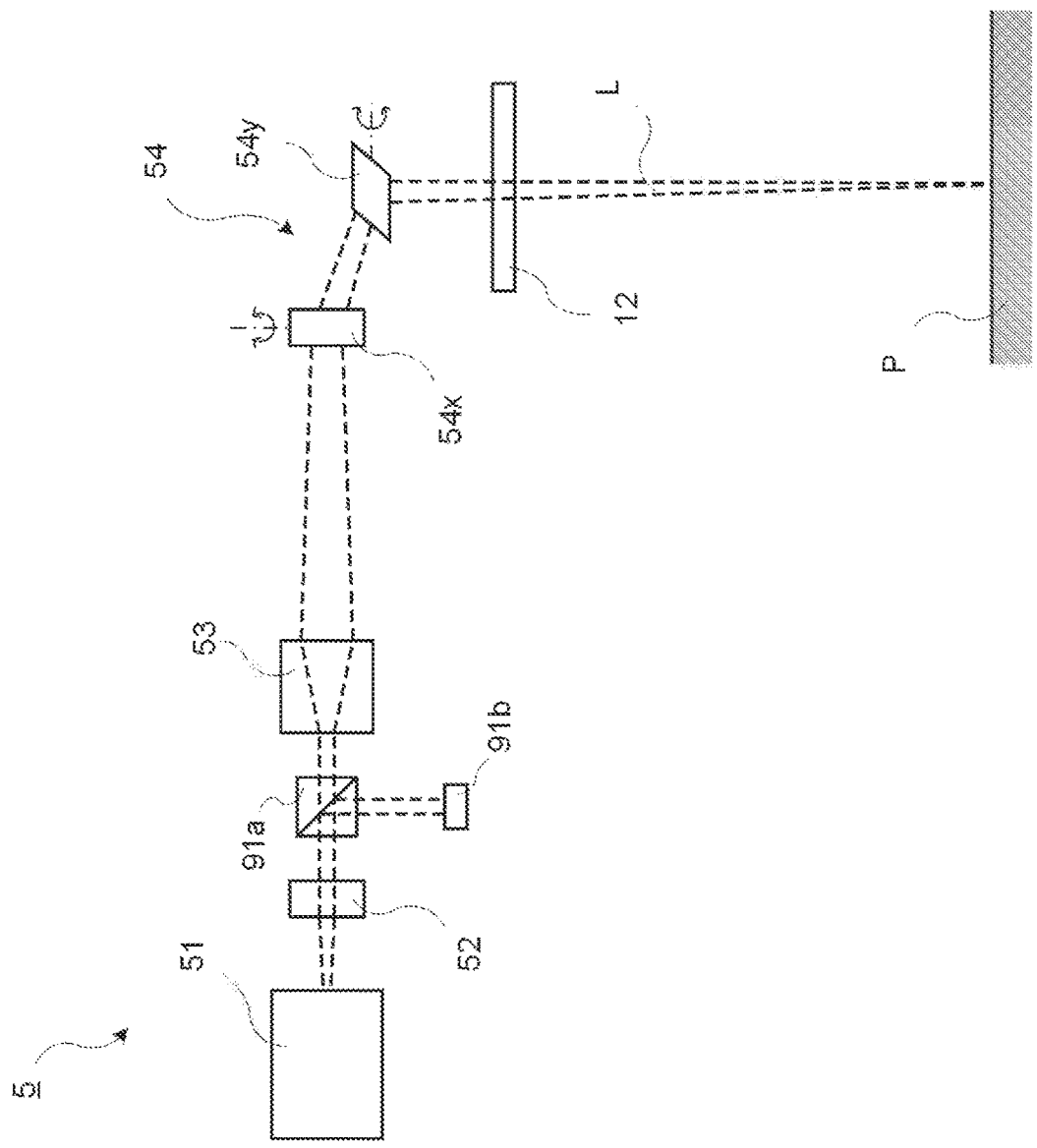
FIG. 5 is a schematic configuration view of an irradiator in another embodiment.

The light source 51 is a laser that generates the laser beam L having a desired laser power and may be any type of layer as long as it is able to sinter or melt the material layer P. For example, the light source 51 is a fiber laser, a CO2 laser, or a YAG laser. The irradiator 5 is configured to be able to detect the laser power outputted from the light source 51 at any time. For instance, the light source 51 includes a monitor output terminal 91 that outputs a signal indicating the laser power. Alternatively, as shown in FIG. 5, the irradiator 5 may be configured to further include a beam splitter 91a splitting the laser beam L outputted from the light source 51, and a light receiving element 91b receiving the laser beam L split by the beam splitter 91a and outputting a signal indicating the laser power.

The collimator 52 converts the laser beam L outputted from the light source 51 into a parallel beam.

The focus control unit 53 controls a diameter of the laser beam L outputted from the light source 51 to a predetermined beam diameter. The focus control unit 53 includes a movable lens 533 that controls a focus position and a lens actuator 532 that moves the movable lens 533 back and forth along an optical axis direction of the laser beam L. The movable lens 533 is, for example, a diffusion lens or a condenser lens. In the present embodiment, the movable lens 533 is the diffusion lens. The laser beam L diffused by the movable lens 533 moved to a desired position is condensed by a condenser lens (not shown) fixed at a predetermined position. The lens actuator 532 is, for example, a motor. The focus control unit 53 is configured to be able to detect the position of the movable lens 533 at any time. For instance, the focus control unit 53 further includes a first encoder 92 that is provided on the lens actuator 532 and output a signal indicating the position of the movable lens 533.

The scanner 54 forms the solidified layer S by scanning the laser beam L on the predetermined irradiation region of the material layer P at a desired scanning speed. The scanner 54 is, for example, a galvanometer scanner, and includes an X-axis galvanometer mirror 54x that scans the laser beam L in a predetermined horizontal X-axis direction, an X-axis actuator 56x that rotates the X-axis galvanometer mirror 54x, a Y-axis galvanometer mirror 54y that scans the laser beam L in a Y-axis direction that is a horizontal direction orthogonal to the X-axis direction, and a Y-axis actuator 56y that rotates the Y-axis galvanometer mirror 54y. Each rotation angle of the X-axis galvanometer mirror 54x and the Y-axis galvanometer mirror 54y is controlled in accordance with the magnitude of a rotation angle control signal inputted from an irradiation controller 86. The X-axis galvanometer mirror 54x and the Y-axis galvanometer mirror 54y control the irradiation position of the laser beam L by reflecting and scanning the laser beam L. The scanner 54 is configured to be able to detect the rotation angle of the X-axis galvanometer mirror 54x and the Y-axis galvanometer mirror 54y at any time. For instance, the scanner 54 further includes a second encoder 93 that is provided on the X-axis actuator 56x and outputs a signal indicating a rotation angle of the X-axis galvanometer mirror 54x, and a third encoder 94 that is provided on the Y-axis actuator 56y and outputs a signal indicating a rotation angle of the Y-axis galvanometer mirror 54y.

The laser beam L reflected by the X-axis galvanometer mirror 54x and the Y-axis galvanometer mirror My passes through a window 7 disposed on a top surface of the chamber 6, and the material layer P is irradiated with the laser beam L. The material layer P is melted or sintered by the laser beam L, and the solidified layer S is formed. The window 7 protects the irradiator 5 from fumes or the like. The window 7 is formed of a material capable of transmitting the laser beam L. If the light source 51 is the fiber laser or the YAG laser, the window 7 may be formed of, for example, quartz glass.

Figure 6:
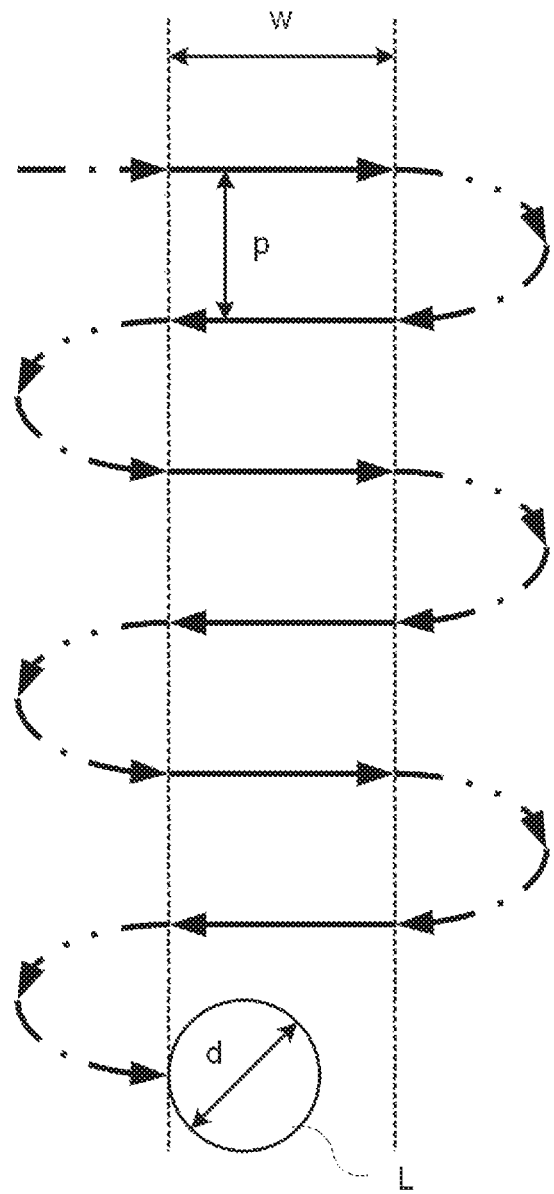
FIG. 6 is a view showing an example of a scanning path of a laser beam.

The irradiator 5 may raster-scan the laser beam L to form the solidified layer S. A part of a scanning path of the laser beam L when raster-scanning is shown in FIG. 6. In raster-scanning, the irradiation region is divided into predetermined widths w, and the laser beam L is irradiated to each of the divided areas. The irradiation of the laser beam L on the plurality of divided areas may be performed simultaneously in parallel. The irradiator 5 gradually advances the irradiation position of the laser beam L in a longitudinal direction orthogonal to the width direction every time the scan in the width direction is performed. An interval p between two adjacent scanning paths in the width direction is set to be equal to or smaller than the beam diameter d of the laser beam L. Specifically, the irradiation position is moved along the arrow shown in FIG. 6. The material layer P is irradiated with the laser beam L in the parts indicated by the solid line arrow to form the solidified layer S. The output of the laser beam L is turned on in the parts indicated by the solid arrow, and the laser beam L is scanned at a substantially constant scanning speed in the parts indicated by the solid arrow. The output of the laser beam L is turned off in the parts indicated by dash-dot line arrows and dash-double-dot line arrows, and the material layer P is unirradiated with the laser beam L. The scanning speed is reduced in the parts indicated by the dash-dot line arrows. The scanning speed is accelerated in the parts indicated by the dash-double-dot line arrows.

The focus control unit 53 corrects the position of the movable lens 533 in accordance with the irradiation position of the laser beam L so that the desired beam diameter can be obtained. In the following description, an irradiation angle is 0° when the laser beam L is irradiated in the vertical direction against the molding surface. When the correction is not performed, the laser beam L has the lowest focus position when the irradiation angle is 0°, and the focus position rises as an absolute value of the irradiation angle increases. The focus position affects the size of the beam diameter. Therefore, when the scanner 54 scans the laser beam L, the focus control unit 53 moves the movable lens 533 each time so that the beam diameter becomes a set size in accordance with the irradiation position.

Figure 7:
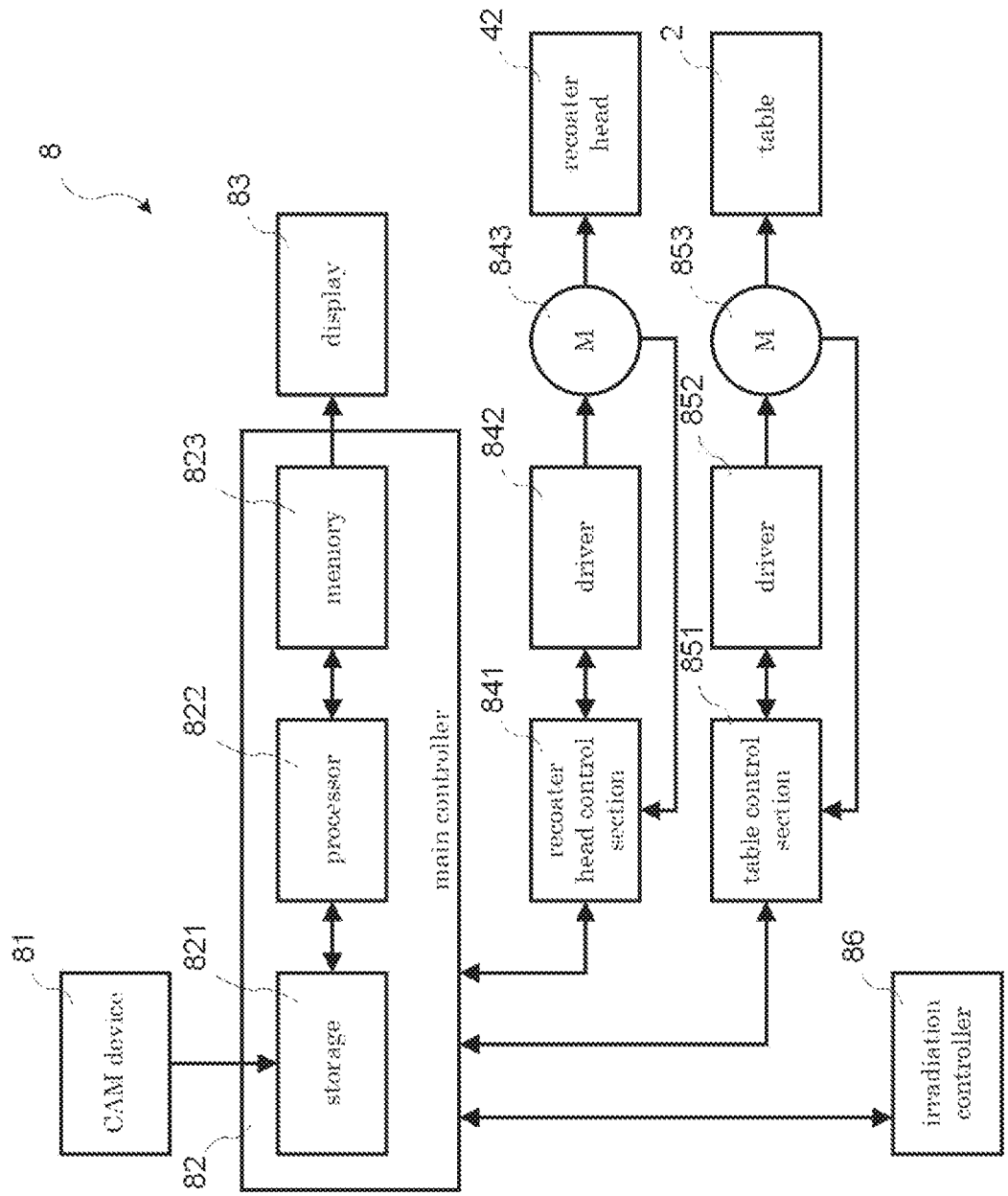
FIG. 7 is a block diagram of a controller.
Figure 8:
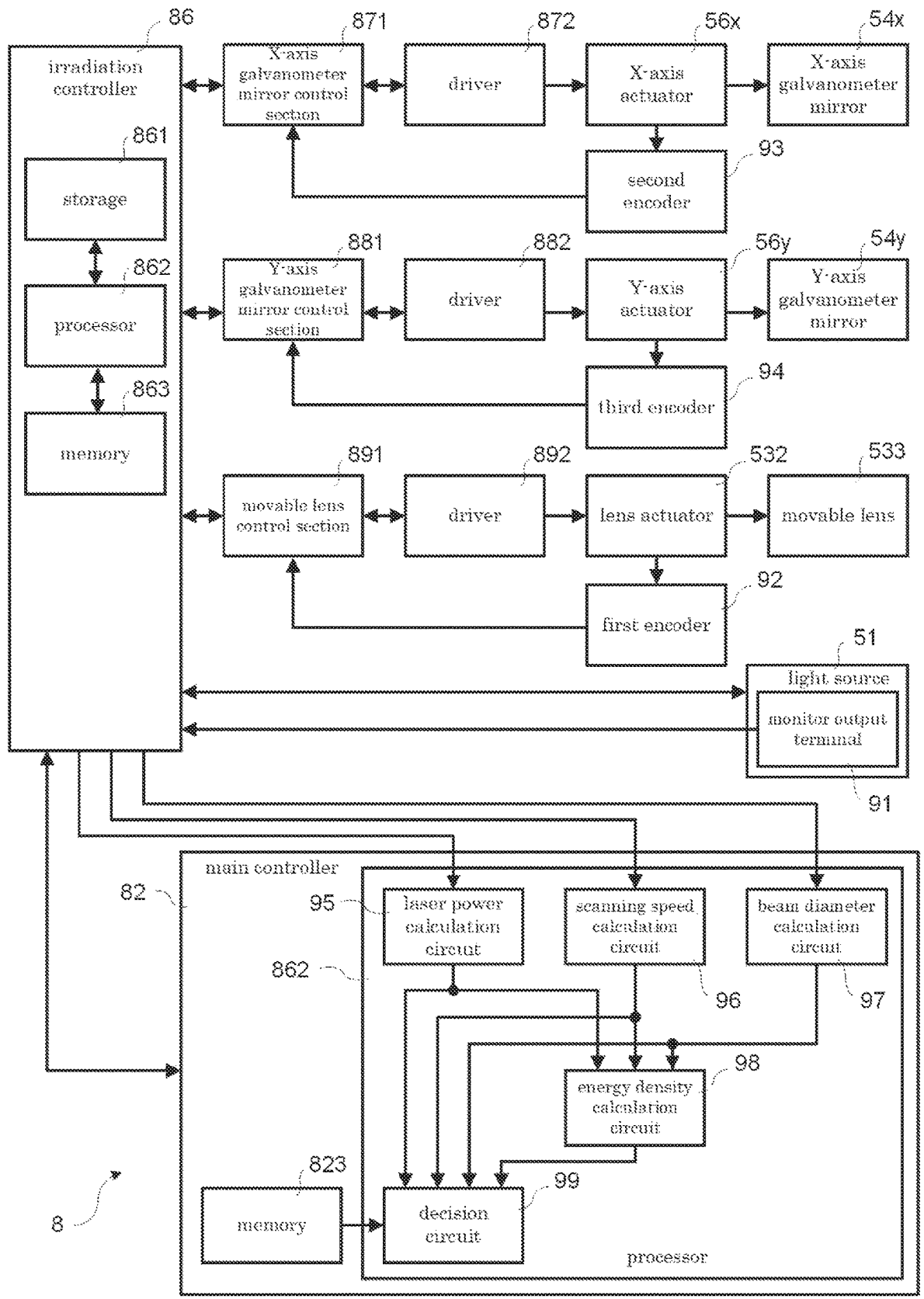
FIG. 8 is a block diagram of the controller.

A controller 8 that controls the lamination molding apparatus 1 will be described below. As shown in FIGS. 7 and 8, the controller 8 includes a main controller 82, a display 83, a recoater head control section 841, a table control section 851, the irradiation controller 86, a X-axis galvanometer mirror control section 871, a Y-axis galvanometer mirror control section 881, and a movable lens control section 891. The controller 8 controls the material layer formation device 4, the table 2, the irradiator 5, and the like. The controller 8 determines whether the state of the solidified layer S is good or poor by confirming the states of the laser power, the scanning speed, the beam diameter, and the energy density of the laser beam L when the solidified layer S is formed.

A CAM device 81 makes a project file including a main program and a molding program, for producing the desired three-dimensional molded object. The main program consists of multiple program lines assigned sequence numbers. Each program line includes a command to sinter or melt in the predetermined divided layer. The molding program includes a command to specify the position that is irradiated with a laser beam L, or the like.

The main controller 82 controls each device in accordance with the project file made by the CAM device 81. The main controller 82 includes a storage 821, a processor 822, and a memory 823. The storage 821 stores the project file acquired from the CAM device 81 through a communication line or a transportable storage medium. The processor 822 analyzes the project file stored in the storage 821 and performs processing for controlling the material layer formation device 4, table 2, and the like. The memory 823 temporarily stores numerical values or data that need to be temporarily stored while the processor 822 performs processing.

The display 83 is connected to the main controller 82 and displays data, an error message, or the like reported from the main controller 82. Operation status of the lamination molding apparatus 1, for example, the laser power, the scanning speed, the beam diameter, and the energy density value of the laser beam L may be displayed on the display 83.

The recoater head control section 841 controls the position of the recoater head 42 based on a command from the main controller 82. A command from the recoater head control section 841 is inputted to a driver 842, which then outputs a drive current corresponding to the command to the motor 843. Thus, the recoater head 42 moves on the base 41. The recoater head control section 841 may also perform feedback control based on a signal from the driver 842, a signal from an encoder (not shown) disposed on the motor 843, or the like.

The table control section 851 controls the position of the table 2 based on a command from the main controller 82. A command from the table control section 851 is inputted to a driver 852, which then outputs a drive current corresponding to the command to the motor 853. Thus, the table 2 is moved in a vertical direction. The table control section 851 may also perform feedback control based on a signal from the driver 852, a signal from an encoder (not shown) disposed on the motor 853, or the like.

The irradiation controller 86 includes a storage 861, a processor 862, and a memory 863. The irradiation controller 86 receives the molding program from the main controller 82 and outputs commands to the X-axis galvanometer mirror control section 871, the Y-axis galvanometer mirror control section 881, and the movable lens control section 891 based on the molding program. Moreover, the irradiation controller 86 outputs a command to the light source 51 to control the intensity or the on/off switch of the laser beam L.

The X-axis galvanometer mirror control section 871 controls the angle of the X-axis galvanometer mirror 54x based on the command from the irradiation controller 86. A command from the X-axis galvanometer mirror control section 871 is inputted to a driver 872, which then outputs a drive current corresponding to the command to an X-axis actuator 56x. Thus, the X-axis galvanometer mirror 54x is rotated. The X-axis galvanometer mirror control section 871 may also perform feedback control based on a signal from the driver 872, a signal from the second encoder 93, or the like.

The Y-axis galvanometer mirror control section 881 controls the angle of the Y-axis galvanometer mirror 54y based on the command from the irradiation controller 86. A command from the Y-axis galvanometer mirror control section 881 is inputted to a driver 882, which then outputs a drive current corresponding to the command to a Y-axis actuator 56y. Thus, the Y-axis galvanometer mirror 54y is rotated. The Y-axis galvanometer mirror control section 881 may also perform feedback control based on a signal from the driver 882, a signal from the third encoder 94, or the like.

The movable lens control section 891 controls the position of the movable lens 533 based on the command from the irradiation controller 86. A command from the movable lens control section 891 is inputted to a driver 982, which then outputs a drive current corresponding to the command to the lens actuator 532. Thus, the movable lens 533 is positioned, and the focus position of the laser beam L is changed, resulting in acquisition of a desired beam diameter. The movable lens control section 891 may also perform feedback control based on a signal from the driver 892, a signal from the first encoder 92, or the like.

As described above, the controller 8 controls each section in accordance with various set values including the laser power, the beam diameter, and the scanning speed defined in the project file. However, even if an appropriate value is set in terms of settings, there is a possibility that it will not operate according to the set value because of restrictions of the apparatus or failure of the apparatus.

Figure 9:
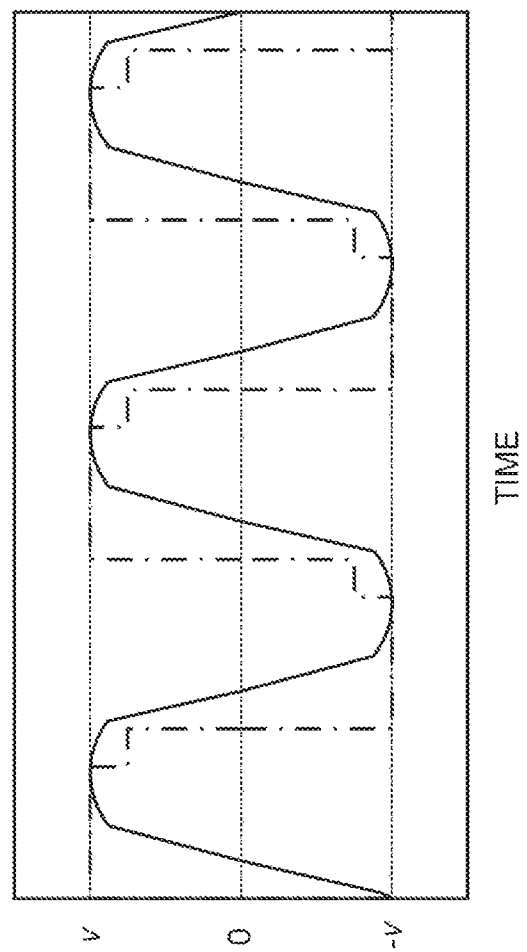
FIG. 9 is a graph showing a state in which a scanning speed of the laser beam is delayed.

For instance, the irradiation position of the laser beam L is determined by the rotation angle of the X-axis galvanometer mirror 54x rotated by the X-axis actuator 56x and the rotation angle of the Y-axis galvanometer mirror 54y rotated by the Y-axis actuator 56y. From the output of the commands by the X-axis galvanometer mirror control section 871 and the Y-axis galvanometer mirror control section 881 to the actual rotations of the X-axis galvanometer mirror 54x and the Y-axis galvanometer mirror 54y to a predetermined angle, delay may occur because of the influence of inertia or the like. As a result, the laser beam L may be scanned later than the setting. FIG. 9 is a graph showing a state in which the scanning of the laser beam L is delayed than the setting. The laser beam L is scanned at a predetermined speed −v to v (−v<0<v). The dash-dot line indicates the set scanning speed of the laser beam L calculated from a command value of the X-axis galvanometer mirror control section 871 and a command value of the Y-axis galvanometer mirror control section 881. The solid line indicates the actual scanning speed of the laser beam L calculated from the output value of the second encoder 93 and the output value of the third encoder 94.

Figure 10:
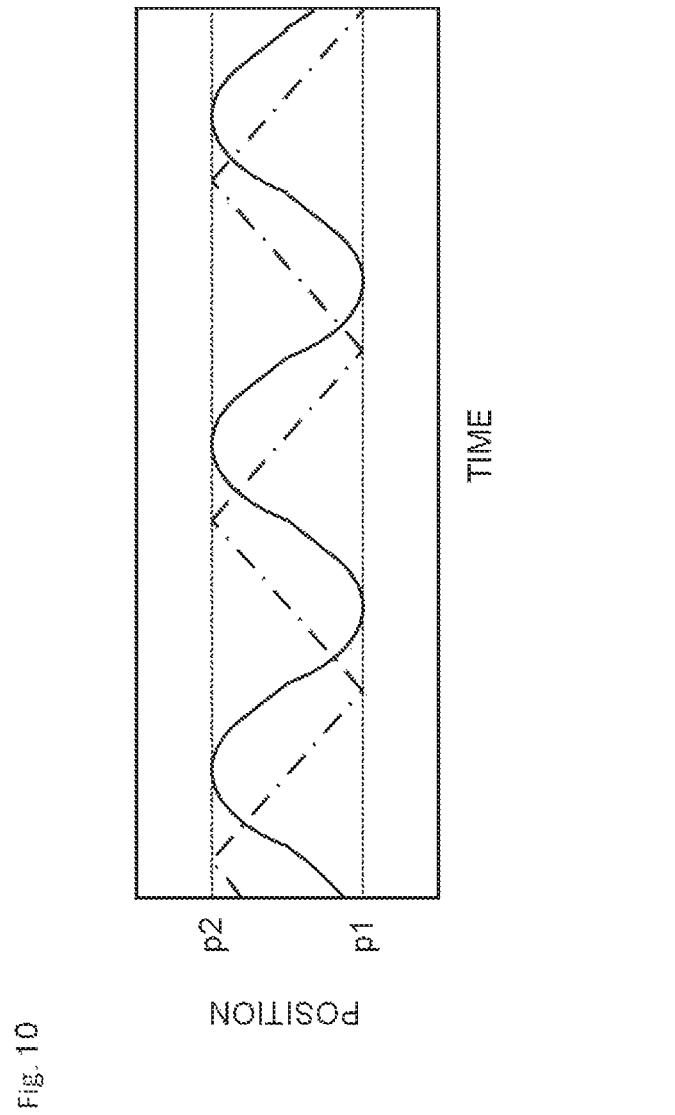
FIG. 10 is a graph showing a state in which a movement of a movable lens is delayed.

For instance, the beam diameter of the laser beam L is determined by the rotation angle of the X-axis galvanometer mirror 54x rotated by the X-axis actuator 56x, the rotation angle of the Y-axis galvanometer mirror My rotated by the Y-axis actuator 56y, and the position of the movable lens 533 that moves in accordance with the lens actuator 532. As described above, a delay may occur until the X-axis galvanometer mirror 54x and the Y-axis galvanometer mirror 54y rotate to a predetermined angle. Moreover, from the output of the command by the movable lens control section 891 to the actual movement of the movable lens 533 to a predetermined position, delay may occur because of the influence of inertia or the like. FIG. 10 is a graph showing a state in which the movement of the movable lens 533 is delayed than the setting. The movable lens 533 moves between predetermined positions p1 and p2. The dash-dot line indicates the set position of the movable lens 533 calculated from the command value of the movable lens control section 891. The solid line indicates the actual position of the movable lens 533 calculated from the output value of the first encoder 92.

Therefore, the lamination molding apparatus 1 of the present embodiment calculates the actual values of the laser power, the beam diameter, and the scanning speed during the formation of the solidification layer S, compares with the reference range, and determines whether the state of the laser beam L is appropriate, thus determines whether the state of the solidified layer S is appropriate. Preferably, the lamination molding apparatus 1 of the present embodiment further calculates the actual values of the energy density during the formation of the solidification layer S, compares with the reference range, and determines whether the state of the laser beam L is appropriate, thus determines whether the state of the solidified layer S is appropriate.

The monitor output terminal 91 outputs a signal indicating the laser power of the laser beam L. The first encoder 92 outputs a signal indicating the position of the movable lens 533. The second encoder 93 outputs a signal indicating the rotation angle of the X-axis galvanometer mirror 54x. The third encoder 94 outputs a signal indicating the rotation angle of the Y-axis galvanometer mirror 54y. Each signal is sent to the main controller 82 via the irradiation controller 86. Note that each signal may be directly sent to a processor that confirms the state of the laser beam L and determines the state of the solidified layer S, that is, the processor 862 of the main controller 82 in the present embodiment.

The processor 862 of the main controller 82 includes a laser power calculation circuit 95, a scanning speed calculation circuit 96, a beam diameter calculation circuit 97, an energy density calculation circuit 98, and a determination circuit 99.

The laser power calculation circuit 95 calculates the laser power of the laser beam L when the solidified layer S is formed. The laser power calculation circuit 95 calculates the laser power of the laser beam L generated by the light source 51 based on the signal outputted from the monitor output terminal 91. As described above, when the irradiator 5 comprises the beam splitter 91a and the light receiving element 91b, the laser power of the laser beam L generated by the light source 51 may be calculated based on the signal outputted from the light receiving element 91b.

The scanning speed calculation circuit 96 calculates the scanning speed of the laser beam L when the solidified layer S is formed. The scanning speed calculation circuit 96 calculates the scanning speed of the laser beam L based on the signals outputted from the second encoder 93 and the third encoder 94.

The beam diameter calculation circuit 97 calculates the beam diameter of the laser beam L when the solidified layer S is formed. The beam diameter calculation circuit 97 calculates the beam diameter of the laser beam L based on the signals outputted from the first encoder 92, the second encoder 93, and the third encoder 94. More specifically, the beam diameter calculation circuit 97 calculates the irradiation position of the laser beam L based on the signals outputted from the second encoder 93 and the third encoder 94, and calculates an optical path length of the laser beam L. The beam diameter calculation circuit 97 calculates the focus position of the laser beam L based on the signals outputted from the first encoder 92. The beam diameter calculation circuit 97 calculates the beam diameter from the optical path length and the focus position.

The energy density calculation circuit 98 calculates the energy density of the laser beam L when the solidified layer S is formed. The energy density calculation circuit 98 calculates the energy density based on Formula 1 from the laser power, the scanning speed, and the beam diameter calculated respectively by the laser power calculation circuit 95, the scanning speed calculation circuit 96, and the beam diameter calculation circuit 97. Moreover, in Formula 1, E[J/mm2] represents the energy density, P[W] represents the laser power, D[mm] represents the beam diameter, and v[mm/s] represents the scanning speed.

$$E = \frac{P}{Dv} \qquad \text{[Formula 1]}$$

The memory 823 of the main controller 82 stores a first reference range related to the laser power, a second reference range related to the scanning speed, a third reference range related to the beam diameter, and a fourth reference range related to the energy density.

The first reference range is a range between the minimum laser power and the maximum laser power, which is assumed to perform good solidification. The second reference range is a range between the minimum scanning speed and the maximum scanning speed, which is assumed to perform good solidification. The third reference range is a range between the minimum beam diameter and the maximum beam diameter, which is assumed to perform good solidification. The first reference range, the second reference range, and the third reference range are determined in accordance with, for example, the type of material of the material layer P. The first reference range, the second reference range, and the third reference range may be stored in the storage 821 as databases or may be manually input by an operator. In the determination, the memory 823 stores the first reference range, the second reference range, and the third reference range.

The fourth reference range may be determined by the first reference range, the second reference range, and the third reference range. That is, the minimum energy density and the maximum energy density can be obtained in a range that satisfies the first reference range, the second reference range, and the third reference range, and the fourth reference range may be set based on these values. Hereinafter, the minimum value of the energy density, in the range that satisfies the first reference range, the second reference range, and the third reference range, is called the first value. The maximum value of the energy density, in the range that satisfies the first reference range, the second reference range, and the third reference range, is called the second value. In the range satisfying the first reference range, the second reference range, and the third reference range, when the laser power is the minimum value of the first reference range, the scanning speed is the maximum value of the second reference range, and the beam diameter is the maximum value of the third reference range, then the value of the energy density becomes the minimum. At this time, the energy density is the first value. In the range satisfying the first reference range, the second reference range, and the third reference range, when the laser power is the maximum value of the first reference range, the scanning speed is the minimum value of the second reference range, and the beam diameter is the minimum value of the third reference range, then the value of the energy density becomes the maximum. At this time, the energy density is the second value. Each energy density can be calculated by Formula 1 above.

The fourth reference range may be a range in which the first value is the minimum value, and the second value is the maximum value.

Further, the fourth reference range may be a range in which a value obtained by adding a predetermined value to the first value is the minimum value, and a value obtained by subtracting a predetermined value to the second value is the maximum value. By doing so, the fourth reference range is narrower than the range of the energy density corresponding to the ranges of the laser power, the scanning speed, and the beam diameter, which is assumed to perform good solidification. According to such a fourth reference range, the state of the laser beam L can be determined more strictly.

Furthermore, the fourth reference range may be stored in the storage 821 as a database. Alternatively, the processor 862 may calculate the fourth reference range based on the first reference range, the second reference range, and the third reference range. In the determination, the memory 823 stores the fourth reference range.

The determination circuit 99 compares the state of the laser beam L with each reference range and determines whether the solidified layer S is good or poor. Specifically, the determination circuit 99 compares the laser power calculated by the laser power calculation circuit 95 with the first reference range. The determination circuit 99 also compares the scanning speed calculated by the scanning speed calculation circuit 96 with the second reference range. The determination circuit 99 further compares the beam diameter calculated by the beam diameter calculation circuit 97 with the third reference range. When at least one of the laser power, the scanning speed, and the beam diameter is outside the reference range, the determination circuit 99 determines that the solidified layer S is poor. Further, the determination circuit 99 compares the energy density calculated by the energy density calculation circuit 98 with the fourth reference range. When the energy density is outside the fourth reference range, the determination circuit 99 determines that the solidified layer S is poor.

Figure 11:
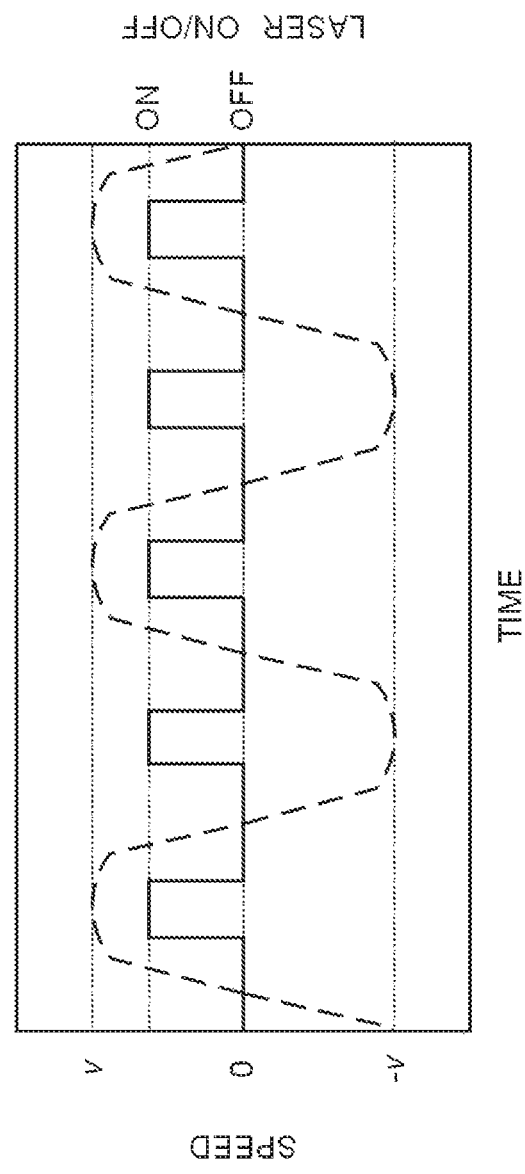
FIG. 11 is a graph showing a relationship between the scanning speed of the laser beam and an irradiation timing of the laser beam.

As described above, when the irradiator 5 raster-scans the laser beam L to form the solidified layer S, there is a time when the output of the laser beam L is temporarily turned off. Specifically, the output of the laser beam L is turned off in the parts indicated by the dash-dot line arrows and the dash-double-dot line arrows in FIG. 6. FIG. 11 is a graph showing the relationship between the scanning speed of the laser beam L and the irradiation timing of the laser beam L. The dash-dot line indicates the actual scanning speed of the laser beam L. The solid line indicates the case when the laser beam L is irradiated (ON) and the case when the laser beam L is unirradiated (OFF). As clearly shown in FIG. 11, the scanning speed when the output of the laser beam L is turned off is lower than the scanning speed when the output of the laser beam L is turned on. Further, when the output of the laser beam L is turned off, the laser power is 0 as a matter of course, and the beam diameter is also 0.

Thus, the determination regarding the laser power, the scanning speed, the beam diameter, and the energy density is performed only when the output of the laser beam L is turned on. In other words, in the present invention, the determination regarding the laser power, the scanning speed, the beam diameter, and the energy density is performed only when the laser beam L is output, the material layer P is irradiated with the laser beam L, and the solidified layer S is formed.

The above-mentioned configuration of the controller 8 is only illustrative, and various modifications may be made thereto as long as the present invention can be carried out. In the present embodiment, the memory 823 of the main controller 82 stores the first reference range, the second reference range, the third reference range, and the fourth reference range, the processor 862 of the main controller 82 calculates the laser power, the scanning speed, the beam diameter, and the energy density, then compares with each reference range to perform the determination. For instance, in addition to the main controller 82, a memory that stores each reference range and a processor that calculates each value and performs the determination may be provided. Further, the memory 863 of the irradiation controller 86 may store each reference range, and the processor 862 of the irradiation controller 86 may calculate each value and perform the determination.

Figure 12:
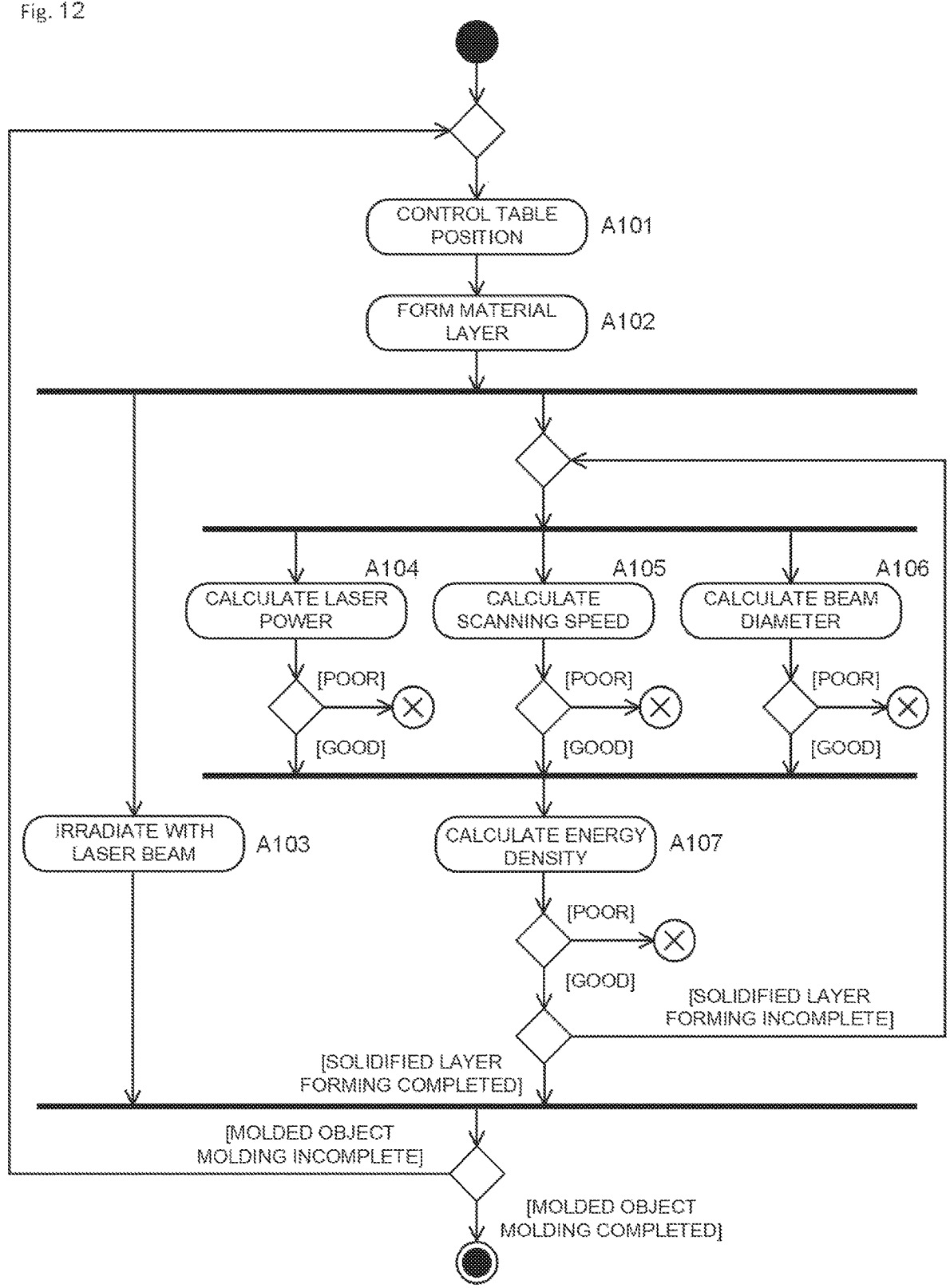
FIG. 12 is an activity diagram showing a method for producing a three-dimensional molded object.

Here, a method for producing a three-dimensional molded object in the present embodiment will be illustrated based on FIG. 12.

First, the position of the table 2 is controlled to a height at which the material layer P having the predetermined thickness can be formed (A101). Thereafter, each time one solidified layer S is formed, the table 2 is lowered by the thickness of one material layer P. Then, the recoater head 42 forms the material layer P while moving on the molding region R (A102). Then, the irradiator 5 forms the solidified layer S by irradiating the irradiation region of the material layer P with the laser beam L (A103).

In parallel with the formation of the solidified layer S, the state of the laser beam L is confirmed. Specifically, the laser power calculation circuit 95 calculates the laser power of the laser beam L when the solidified layer S is formed (A104). The determination circuit 99 compares the laser power calculated by the laser power calculation circuit 95 with the first reference range. The scanning speed calculation circuit 96 calculates the scanning speed of the laser beam L when the solidified layer S is formed (A105). The determination circuit 99 compares the scanning speed calculated by the scanning speed calculation circuit 96 with the second reference range. The beam diameter calculation circuit 97 calculates the beam diameter of the laser beam L when the solidified layer S is formed (A106). The determination circuit 99 compares the beam diameter calculated by the beam diameter calculation circuit 97 with the third reference range. When at least one of the laser power, the scanning speed, and the beam diameter is outside the reference range, the determination circuit 99 determines that the solidified layer S is poor.

When the laser power, the scanning speed, and the beam diameter are all in the reference range, the energy density calculation circuit 98 calculates the energy density of the laser beam L when the solidified layer S is formed (A107). The determination circuit 99 compares the energy density calculated by the energy density calculation circuit 98 with the fourth reference range. When the energy density is outside the fourth reference range, the determination circuit 99 determines that the solidified layer S is poor.

The calculation and the determination of the laser power, the scanning speed, the beam diameter, and the energy density of the laser beam L (A104-A107) are performed repeatedly until the forming of the solidified layer S (A103) is completed. When the laser power, the scanning speed, the beam diameter, and the energy density have been all in the reference range until the forming of the solidified layer S is completed, the above procedure (A101-A107) is repeated until the desired three-dimensional molded object is formed.

If at least one of the laser power, the scanning speed, the beam diameter, and the energy density is outside the reference range, that is, if it is determined that the solidified layer S is poor, the controller 8 suspends the molding, for example. Moreover, an error message may be displayed on the display 83.

The invention claimed is:

1. A method for producing a three-dimensional molded object, comprising:

controlling an irradiator to generate a laser beam having a desired laser power, adjusting the laser beam to a desired beam diameter, and forming a solidified layer by scanning the laser beam on a predetermined irradiation region of a material layer at a desired scanning speed, wherein the irradiator includes:

a light source configured to generate the laser beam having the desired laser power, a movable lens configured to adjust the laser beam to the desired beam diameter, and a scanner configured to scan the laser beam at the desired scanning speed by rotating an X-axis galvanometer mirror and a Y-axis galvanometer mirror, and the irradiator is configured to output a signal indicating the laser power of the laser beam, a signal indicating a position of the movable lens a signal indicating a rotation angle of the X-axis galvanometer mirror and a signal indicating a rotation angle of the Y-axis galvanometer mirror;

calculating an actual value of the laser power of the laser beam when forming the solidified layer based on the signal indicating the laser power of the laser beam;

calculating an actual value of the scanning speed of the laser beam when forming the solidified layer based on the signal indicating the rotation angle of the X-axis galvanometer mirror and the signal indicating the rotation angle of the Y-axis galvanometer mirror;

calculating an actual value of the beam diameter of the laser beam when forming the solidified layer based on the signal indicating the position of the movable lens, the signal indicating the rotation angle of the X-axis galvanometer mirror and the signal indicating the rotation angle of the Y-axis galvanometer mirror; and determining, during molding of the three-dimensional object, that the solidified layer is poor when the actual value of the laser power is outside a first reference range related to the laser power, the actual value of the scanning speed is outside a second reference range related to the scanning speed, or the actual value of the beam diameter is outside a third reference range related to the beam diameter.

2. The method for producing the three-dimensional molded object of claim 1, further comprising:

calculating an actual value of an energy density of the laser beam when forming the solidified layer from the actual value of the laser power, the actual value of the scanning speed and the actual value of the beam diameter; and determining that the solidified layer is poor when the energy density is outside a fourth reference range related to the energy density of the laser beam, even if the actual value of the laser power is within the first reference range, the actual value of the scanning speed is within the second reference range, and the actual value of the beam diameter is within the third reference range, wherein a minimum value of the fourth reference range is a value obtained by adding a predetermined value to a value of the energy density when the laser beam having the laser power of a minimum value of the first reference range, the scanning speed of a maximum value of the second reference range, and the beam diameter of a maximum value of the third reference range, and a maximum value of the fourth reference range is a value obtained by subtracting a predetermined value to the value of the energy density when the laser beam having the laser power of a maximum value of the first reference range, the scanning speed of a minimum value of the second reference range, and the beam diameter of a minimum value of the third reference range.

3. The method for producing the three-dimensional molded object of claim 1, wherein molding is suspended when the solidified layer is determined to be poor.

* * * * *